(12) United States Patent
Nakashimo

(10) Patent No.: US 10,514,306 B2
(45) Date of Patent: Dec. 24, 2019

(54) OVERHEAT DETECTION CIRCUIT, OVERHEAT PROTECTION CIRCUIT, AND SEMICONDUCTOR DEVICE

(71) Applicant: SII Semiconductor Corporation, Chiba-shi, Chiba (JP)

(72) Inventor: Takao Nakashimo, Chiba (JP)

(73) Assignee: ABLIC INC., Chiba (JP)

( * ) Notice: Subject to any disclaimer, the term of this patent is extended or adjusted under 35 U.S.C. 154(b) by 242 days.

(21) Appl. No.: 15/346,250

(22) Filed: Nov. 8, 2016

(65) Prior Publication Data

US 2017/0131155 A1 May 11, 2017

(30) Foreign Application Priority Data

Nov. 9, 2015 (JP) .................................. 2015-219614

(51) Int. Cl.
*G01K 7/16* (2006.01)

(52) U.S. Cl.
CPC ...................................... *G01K 7/16* (2013.01)

(58) Field of Classification Search
CPC ................... G01K 7/16; G01K 7/20; G01K 3/005; G01K 1/12; G01K 7/01; H02H 5/04; H02H 5/044; H01L 27/0259
USPC .................. 324/691, 703, 719, 721
See application file for complete search history.

(56) References Cited

U.S. PATENT DOCUMENTS

| | | | | |
|---|---|---|---|---|
| 4,549,074 A * | 10/1985 | Matsuo | ................ | H05B 1/0272 219/212 |
| 2005/0264971 A1 * | 12/2005 | Morino | ................... | G01K 3/005 361/103 |
| 2010/0321845 A1 * | 12/2010 | Imura | ..................... | G05F 1/569 361/86 |
| 2013/0088832 A1 * | 4/2013 | Li | .......................... | H02H 5/042 361/679.48 |

FOREIGN PATENT DOCUMENTS

JP 2007-312529 A 11/2007

* cited by examiner

*Primary Examiner* — Lisa M Caputo
*Assistant Examiner* — Janice M Soto
(74) *Attorney, Agent, or Firm* — Brinks Gilson & Lione

(57) ABSTRACT

Provided is an overheat detection circuit capable of easily adjusting a detection temperature of the overheat detection circuit. The overheat detection circuit includes: a first resistor; a second resistor, which has the same temperature characteristics with the first resistor, and has an adjustable resistance value; and a heat sensitive element connected to one end of the second resistor, in which a first current, which is based on a first voltage, is supplied to the first resistor, a current, which is proportional to the first current, is supplied to the second resistor so that a second voltage is generated at another end of the second resistor, and when the first voltage and the second voltage are compared, a result of the comparison is output as an overheat detection signal.

3 Claims, 6 Drawing Sheets

US 10,514,306 B2

OVERHEAT DETECTION CIRCUIT, OVERHEAT PROTECTION CIRCUIT, AND SEMICONDUCTOR DEVICE

RELATED APPLICATIONS

This application claims priority under 35 U.S.C. § 119 to Japanese Patent Application No. 2015-219614 filed on Nov. 9, 2015, the entire content of which is hereby incorporated by reference.

BACKGROUND OF THE INVENTION

1. Field of the Invention

The present invention relates to an overheat detection circuit, an overheat protection circuit including the overheat detection circuit, and a semiconductor device including the overheat protection circuit.

2. Description of the Related Art

FIG. 6 is a circuit diagram for illustrating a related-art overheat detection circuit 600.

The related-art overheat detection circuit 600 is configured in the following manner.

A constant current source 608 is connected between a power supply terminal 60 and an anode of a diode 601, to thereby output a constant current JO.

A cathode of the diode 601 is connected to one end of an adjustable resistor 613, and another end of the adjustable resistor 613 is connected to a ground terminal 61. The anode of the diode 601 is connected to a gate of a P-channel transistor 611. A source of the P-channel transistor 611 is connected to the power supply terminal 60 and a drain thereof is connected to an output terminal 62.

Resistors 609 and 610 are connected in series between the power supply terminal 60 and the ground terminal 61. A gate of an N-channel transistor 612 is connected to a node between the resistor 609 and the resistor 610. A drain of the N-channel transistor 612 and a source thereof are connected to the output terminal 62 and the ground terminal 61, respectively.

When temperature increases, an absolute value of a threshold voltage (Vth) of the P-channel transistor 611 decreases. Meanwhile, a voltage at an anode terminal of the diode 601 decreases. That is, a difference between a voltage at a gate terminal of the P-channel transistor 611 and a voltage at the power supply terminal 60 increases.

Therefore, when temperature increases, the threshold voltage (Vth) of the P-channel transistor 611 and the difference between the voltage at the gate terminal of the P-channel transistor 611 and the voltage at the power supply terminal 60 reverse, to thereby turn on the P-channel transistor 611 and invert a voltage at the output terminal 62 from an electric potential at the ground terminal 61 to an electric potential at the power supply terminal 60.

In this way, the related-art overheat detection circuit 600 is configured to detect a state of overheating based on change in voltage at the output terminal 62 (for example, see Japanese Patent No. 4920305).

However, in order to adjust a detection temperature of the overheat detection circuit with the related art, a resistance value of the adjustable resistor 613 needs to be adjusted in consideration of a threshold voltage of the P-channel transistor 611, temperature characteristics of the threshold voltage of the P-channel transistor 611, a value of an output current I0 of the constant current source 608, temperature characteristics of the constant current source 608, and temperature characteristics of the adjustable resistor 613. The threshold value and the resistance value of the transistor, and the constant current each vary due to process variation, and thus, all of those variations need to be taken into consideration. This has made such adjustment extremely difficult.

SUMMARY OF THE INVENTION

The present invention has been made in order to solve the problems described above, and realizes an overheat detection circuit having satisfactory detection precision with which adjustment can be easily performed.

According to one embodiment of the present invention, there is provided an overheat detection circuit including: a first resistor; a second resistor, which has the same temperature characteristics with the first resistor, and has an adjustable resistance value; and a heat sensitive element connected to one end of the second resistor, in which a first current, which is based on a first voltage, is supplied to the first resistor, a current, which is proportional to the first current, is supplied to the second resistor so that a second voltage is generated at another end of the second resistor, and when the first voltage and the second voltage are compared, a result of the comparison is output as an overheat detection signal.

The overheat detection circuit according to the present invention can easily adjust manufacturing variation because the temperature characteristics of the first resistor and the second resistor are the same.

DETAILED DESCRIPTION OF THE PREFERRED EMBODIMENTS

Figure 1:
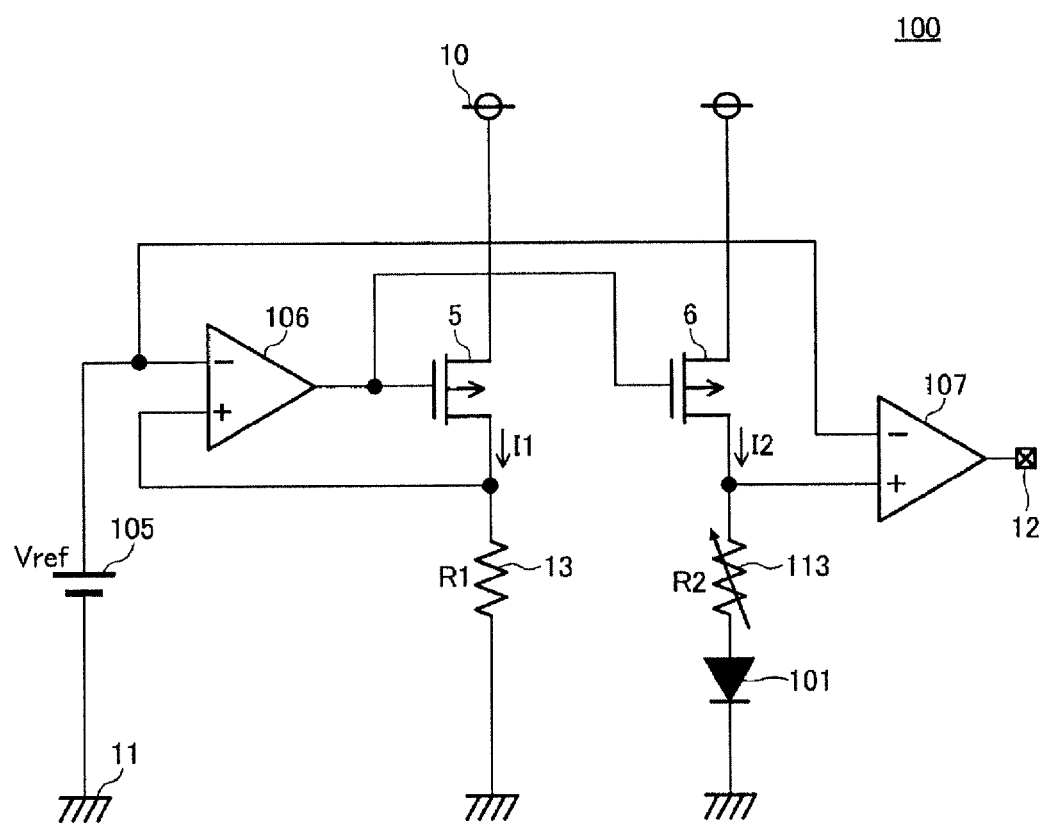
FIG. 1 is a circuit diagram for illustrating an overheat detection circuit according to a first embodiment of the present invention.

FIG. 1 is an illustration of an overheat detection circuit 100 according to a first embodiment of the present invention.

The overheat detection circuit 100 is configured in the following manner.

A voltage (hereinafter referred to as Vref) output from a reference voltage source 105 is input to an inverting input terminal of a differential amplifier 106. One end of a resistor 13 and a drain of a P-channel transistor 5 are connected to a non-inverting input terminal of the differential amplifier 106. An output terminal of the differential amplifier 106 is connected to a gate of the P-channel transistor 5 and a gate of a P-channel transistor 6. A source of the P-channel transistor 5 is connected to a power supply terminal 10. Another end of the resistor 13 is connected to a ground terminal 11. A source of the P-channel transistor 6 is connected to the power supply terminal 10, and a drain thereof is connected to one end of an adjustable resistor 113 that has an adjustable resistance value. An anode and a cathode of a diode 101 are connected to another end of the adjustable resistor 113 and the ground terminal 11, respectively.

A voltage comparator 107 compares a value of Vref and an electric potential at the one end of the adjustable resistor 113, to thereby output a signal of a result of the comparison to an output terminal 12 as an overheat detection signal.

The differential amplifier 106 and the P-channel transistor 5 are controlled such that an electric potential at the one end of the resistor 13 becomes equal to Vref. Therefore, assuming that a resistance value of the resistor 13 is R1, a current flowing through the resistor 13 is:

$$I1=Vref/R1 \quad \text{Expression 1.}$$

The P-channel transistor 5 and the P-channel transistor 6 share a gate and a source, and hence current I2 output from the P-channel transistors can be made proportional to the current I1.

$$I1=\alpha I2 \quad \text{Expression 2,}$$

where $\alpha$ is an arbitrary proportionality factor. Assuming that a forward voltage of the diode 101 is Vf and the resistance value of the adjustable resistor 113 is R2, a signal output from the voltage comparator 107 is inverted with Expression 3 as a threshold value.

$$Vref=I2*R2+Vf \quad \text{Expression 3.}$$

By configuring each of the resistor 13 and the adjustable resistor 113 such that the temperature characteristics thereof are equal to each other, a proportional relationship is established between the resistance values R1 and R2.

$$R1=\beta R2 \quad \text{Expression 4,}$$

where $\beta$ is an arbitrary proportionality factor. The following expression holds true from Expressions 1 to 4:

$$(1-1/(\alpha \cdot \beta))Vref=Vf \quad \text{Expression 5.}$$

$\alpha$ and $\beta$ are proportionality factors, and therefore a change in temperature of Vf and a change in temperature of Vref cause the signal output by the voltage comparator 107 to invert at a certain temperature. In this way, it is possible to detect a change in temperature.

In particular, when the change in temperature of Vref is sufficiently small, only $\beta$ needs to be adjusted by the adjustable resistor 113 by only taking into consideration the change in temperature of Vf and not relying on the value of Vref, such that the output signal inverts at an arbitrary temperature. That is, in this embodiment, in adjustment of detection temperature of the overheat detection circuit, it is not necessary to take into consideration all variations in threshold values and resistance values of the transistors as in a related-art overheat detection circuit, thereby providing the effect of being able to easily adjust the detection temperature.

Figure 2:
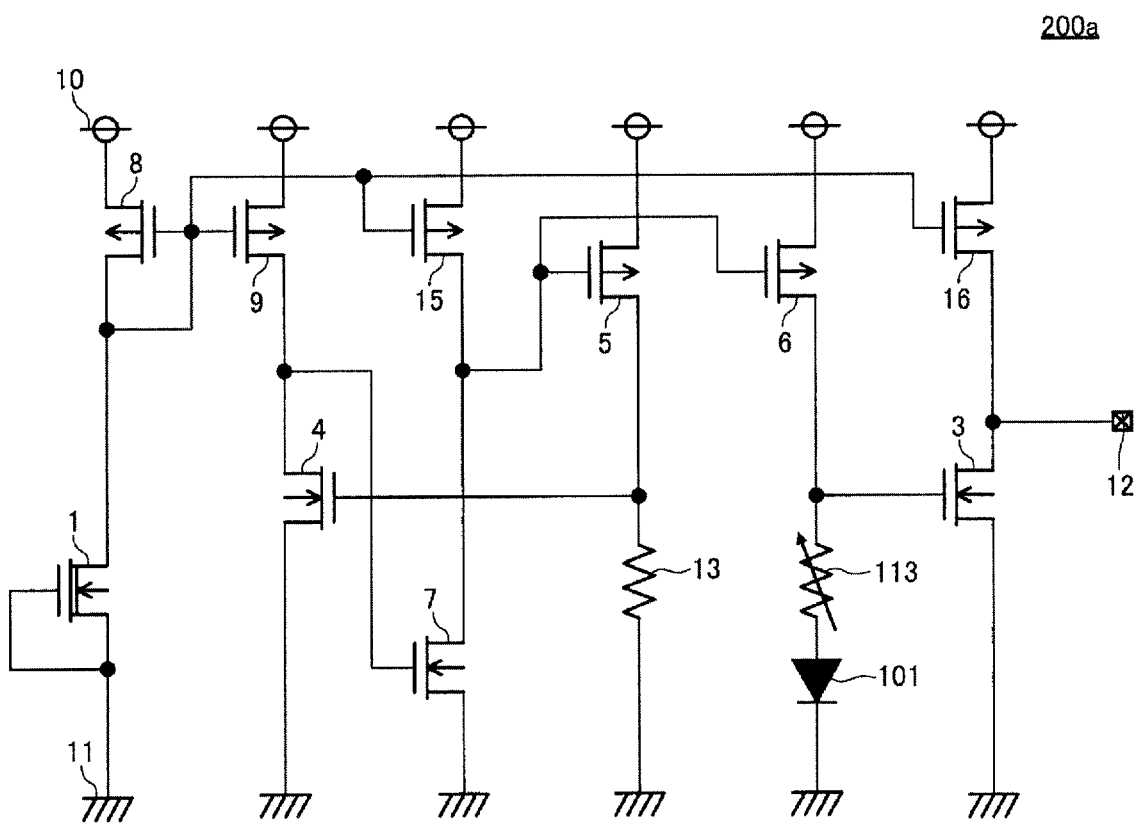
FIG. 2 is a circuit diagram for illustrating a first example of an overheat detection circuit according to a second embodiment of the present invention.

FIG. 2 is a circuit diagram for illustrating an overheat detection circuit 200a as a first example of an overheat detection circuit according to a second embodiment of the present invention.

The overheat detection circuit 200a is configured in the following manner.

A drain of an N-channel depletion transistor 1 is connected to a drain and a gate of a P-channel transistor 8, a gate of a P-channel transistor 9, a gate of a P-channel transistor 15, and a gate of a P-channel transistor 16. A gate and a source of the N-channel depletion transistor 1 are connected to the ground terminal 11.

A source of the P-channel transistor 8 is connected to the power supply terminal 10.

A drain of the P-channel transistor 9 is connected to a drain of an N-channel transistor 4 and a gate of an N-channel transistor 7. A source of the P-channel transistor 9 is connected to the power supply terminal 10.

A source of the N-channel transistor 4 is connected to the ground terminal 11, and a gate thereof is connected to the one end of the resistor 13 and the drain of the P-channel transistor 5.

A source of the N-channel transistor 7 is connected to the ground terminal 11, and a drain thereof is connected to the gate of the P-channel transistor 5, a drain of the P-channel transistor 15, and the gate of the P-channel transistor 6.

A source of the P-channel transistor 15 and the source of the P-channel transistor 5 are connected to the power supply terminal 10.

The other end of the resistor 13 is connected to the ground terminal 11.

The source and the drain of the P-channel transistor 6 are connected to the power supply terminal 10, and the one end of the adjustable resistor 113 and a gate of an N-channel transistor 3, respectively.

The anode and the cathode of the diode 101 are connected to the another end of the adjustable resistor 113 and the ground terminal 11, respectively.

A drain of the P-channel transistor 16 is connected to the output terminal 12 and a drain of the N-channel transistor 3, and a source thereof is connected to the power supply terminal 10.

A source of the N-channel transistor 3 is connected to the ground terminal 11.

Next, operation of the overheat detection circuit 200a is described.

The N-channel depletion transistor 1 is configured to supply a bias current to the N-channel transistor 4 via a current mirror circuit constructed with the P-channel transistors 8 and 9. The N-channel transistors 4 and 7 and the P-channel transistors 15 and 5 construct a negative feedback circuit, and are controlled in the same way as in the first embodiment such that a gate voltage of the N-channel transistor 4 becomes equal to the constant voltage Vref determined by a threshold voltage of the N-channel transistor 4 and the bias current supplied by the N-channel depletion transistor 1.

The N-channel depletion transistor 1 is further configured to supply the bias current to the N-channel transistor 3 via a current mirror circuit constructed with the P-channel transistors 8 and 16.

Through adjustment of a current mirror ratio and a size ratio between the N-channel transistors 4 and 3, the threshold voltage at which a signal output from the output terminal 12 inverts can be synchronized with Vref when the gate voltage of the N-channel transistor 3 changes.

Therefore, the signal output from the output terminal 12 inverts at a certain temperature. This temperature is set similarly to that in the first embodiment.

As a result, the second embodiment provides similar effects to those of the first embodiment.

Figure 3:
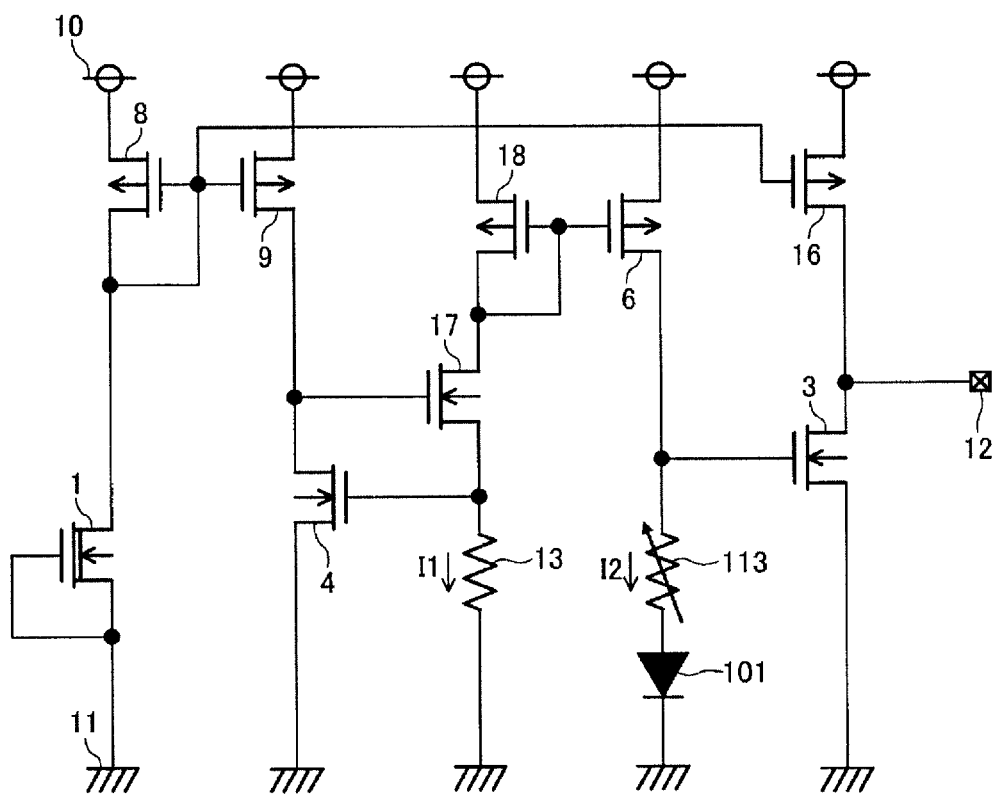
FIG. 3 is a circuit diagram for illustrating a second example of the overheat detection circuit according to the second embodiment.

FIG. 3 is a circuit diagram for illustrating an overheat detection circuit 200b as a second example of the overheat detection circuit according to the second embodiment.

Compared to the overheat detection circuit 200a illustrated in FIG. 2 which employs the N-channel transistor 7 and the P-channel transistors 15 and 5, a gate of an N-channel transistor 17 is connected to the drain of the N-channel transistor 4 and the drain of the P-channel transistor 9.

Further, a drain of the N-channel transistor 17 is connected to a source and a gate of a P-channel transistor 18 and the gate of the P-channel transistor 6, and a source of the N-channel transistor 17 is connected to a gate of the N-channel transistor 4 and the one end of the resistor 13.

Further, the source of the P-channel transistor 18 is connected to the power supply terminal 10.

By connecting in this way, the N-channel transistor 17 can be controlled such that the source and the gate thereof have the same electric potential.

Further, the P-channel transistor 18 and the P-channel transistor 6 construct a current mirror circuit, and therefore the current I1 flowing through the resistor 13 and the current I2 flowing through the adjustable resistor 113 can be made to have a proportional relationship.

Therefore, operation equivalent to that of the overheat detection circuit 200a of FIG. 2 can also be achieved with the configuration described above.

Figure 4:
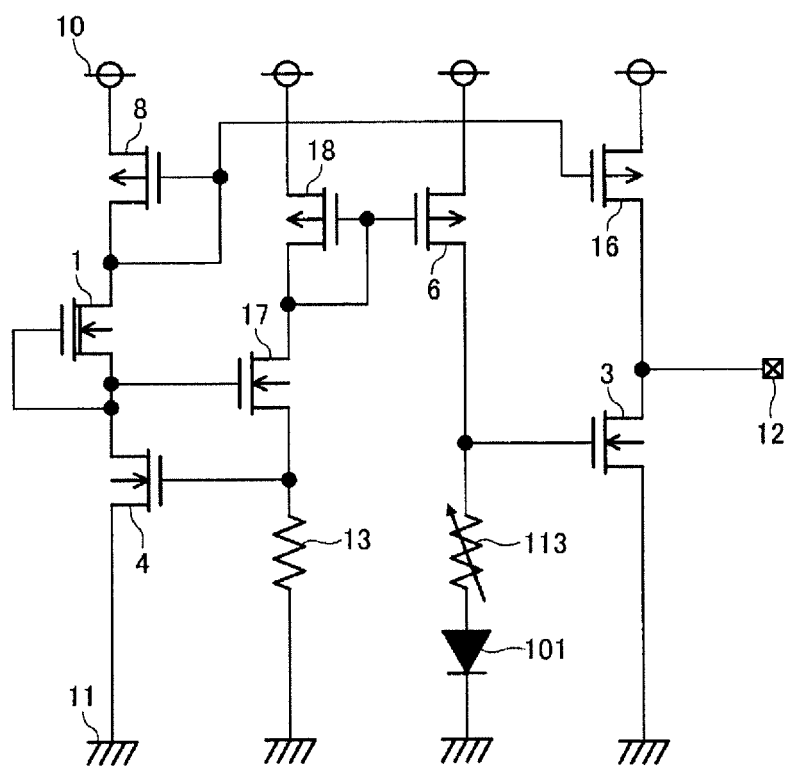
FIG. 4 is a circuit diagram for illustrating a third example of the overheat detection circuit according to the second embodiment.

FIG. 4 is a circuit diagram for illustrating an overheat detection circuit 200c as a third example of the overheat detection circuit according to the second embodiment.

Compared to the overheat detection circuit 200b illustrated in FIG. 3 which employs the P-channel transistor 9, the gate and the source of the N-channel depletion transistor 1 are connected to the drain of the N-channel transistor 4 and the gate of the N-channel transistor 17.

By connecting in this way, the bias current can be supplied to the N-channel transistor 4 without the intermediation of the current mirror circuit. Therefore, operation equivalent to that of the overheat detection circuit 200b of FIG. 3 can be achieved.

Figure 5:
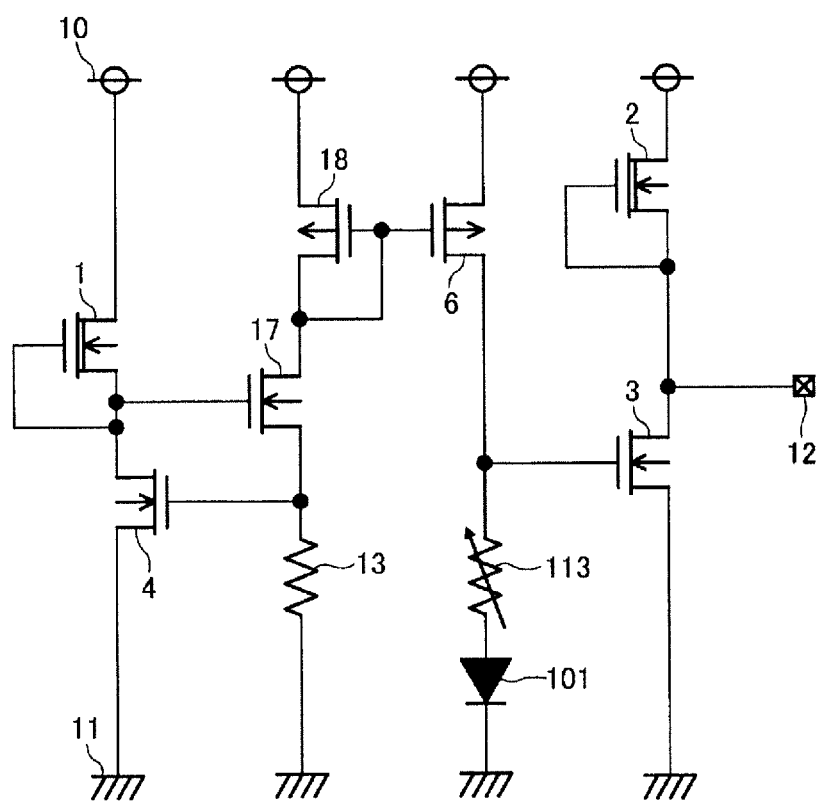
FIG. 5 is a circuit diagram for illustrating a fourth example of the overheat detection circuit according to the second embodiment.
Figure 6:
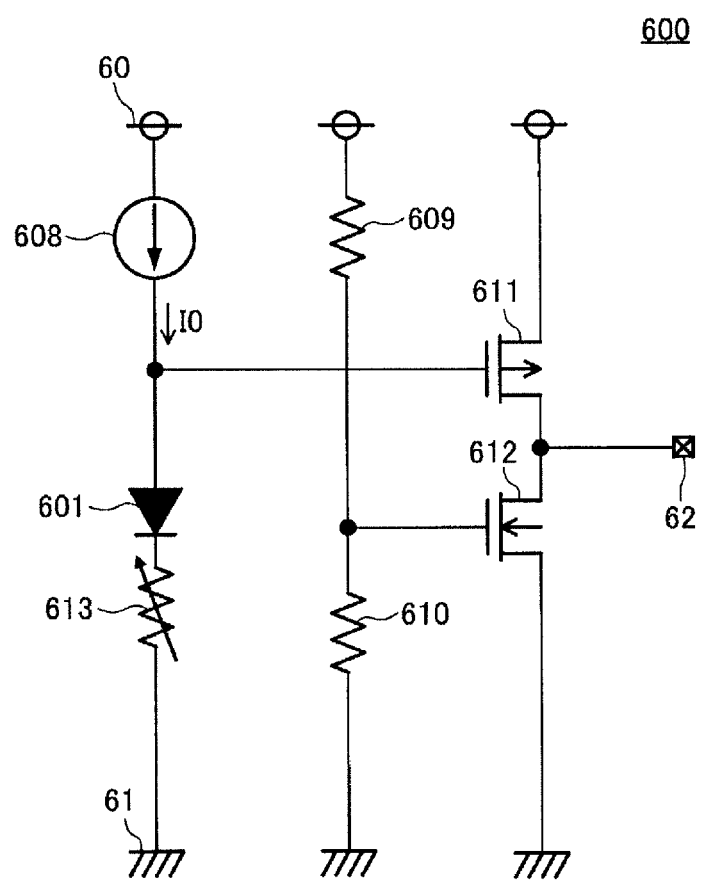
FIG. 6 is a diagram for illustrating a related-art overheat detection circuit.

FIG. 5 is a circuit diagram for illustrating an overheat detection circuit 200d as a fourth example of the overheat detection circuit according to the second embodiment.

Compared to the overheat detection circuit 200c illustrated in FIG. 4 which employs the P-channel transistor 16, a gate and a source of an N-channel depletion transistor 2 are connected to the drain of the N-channel transistor 3 and the output terminal 12.

Through combination of the characteristics of the N-channel depletion transistor 2 and the characteristics of the N-channel depletion transistor 1, a current proportional to the bias current flowing through the N-channel transistor 4 can be supplied to the N-channel transistor 3 without intermediation of the current mirror circuit, and thus operation equivalent to that of the overheat detection circuit 200a of FIG. 2 can be achieved.

As described above, according to the present invention, it is possible to easily adjust the detection temperature in an overheat detection circuit.

The present invention can also provide an overheat protection circuit, which includes the overheat detection circuit described above in the respective embodiments and which is configured to protect a device from overheating through use of a detection signal detected by the overheat detection circuit, and a semiconductor device including the overheat protection circuit.

What is claimed is:

1. An overheat detection circuit, comprising:
   a first resistor connected between a power supply and a ground terminal;
   a second resistor connected between the power supply and the ground terminal and having a same temperature characteristic as the first resistor, and having an adjustable resistance value;
   a heat sensitive element connected to a first end of the second resistor,
   wherein a first current, based on a first voltage, is supplied to the first resistor,
   wherein a second current, proportional to the first current, is supplied to the second resistor such that a second voltage is generated at a second end of the second resistor; and
   a comparator having a first input receiving a reference voltage and a second input receiving the second voltage,
   wherein the comparator compares the reference voltage and the second voltage and outputs an overheat detection signal.

2. An overheat protection circuit, comprising the overheat detection circuit of claim 1.

3. A semiconductor device, comprising the overheat protection circuit of claim 2.

* * * * *